Patented Sept. 3, 1940

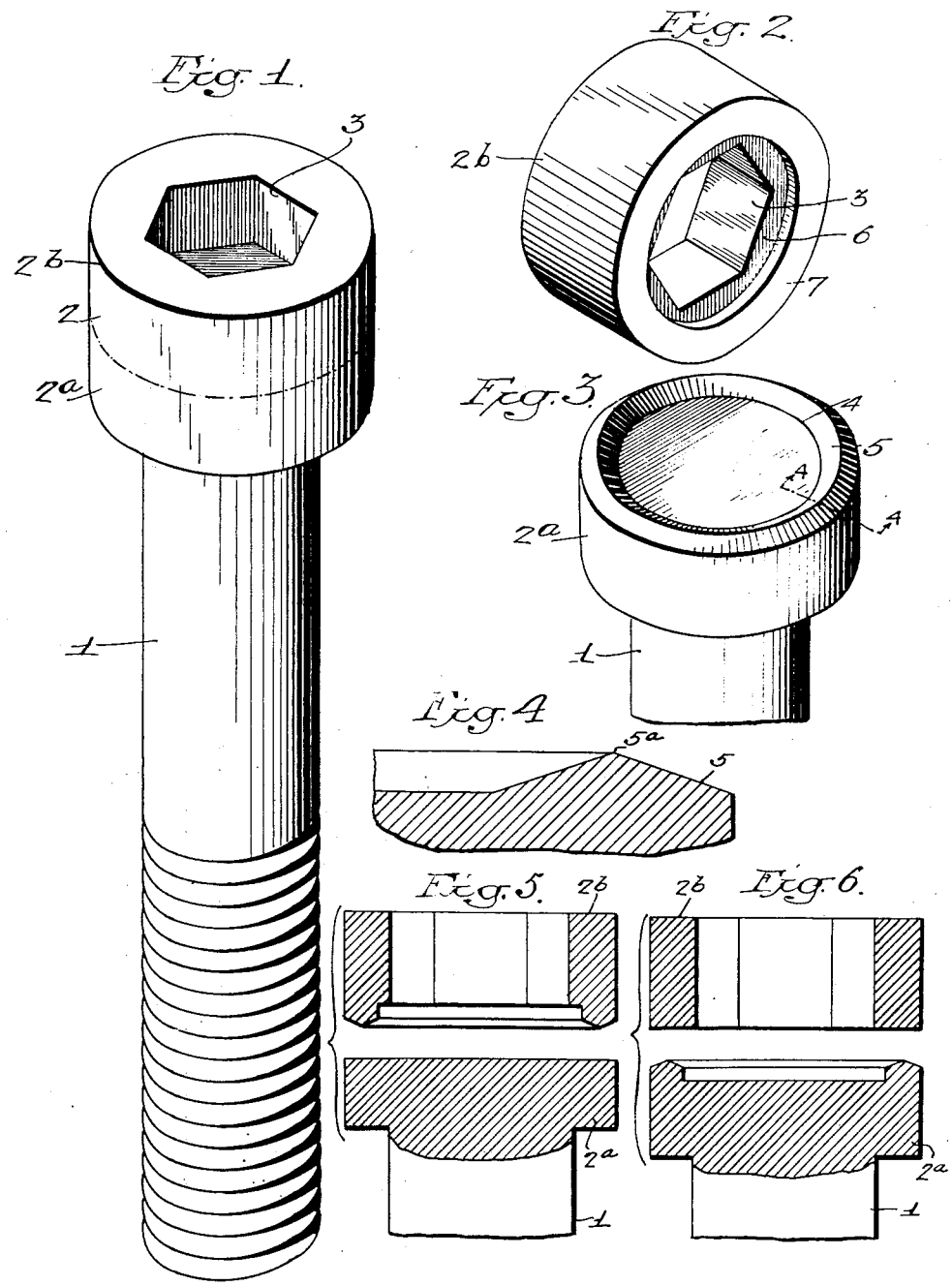

2,213,630

UNITED STATES PATENT OFFICE 2,213,630

SOCKETED CAP SCREW AND METHOD OF PRODUCING SAME

Harald F. Gade, Philadelphia, Pa., assignor to Standard Pressed Steel Co., Jenkintown, Pa., a corporation of Pennsylvania Application April 14, 1938, Serial No. 202,061
Renewed February 2, 1940

9 Claims. (Cl. 10—10)

This invention relates to improvements in machine screws of the type having a cylindrical head provided in its outer end with a socket, conventionally hexagonal in form, for reception of a suitable wrench. This type of screw is known in the trade as a socket head cap screw.

In a screw of this type, the essential physical characteristic of the working portion, i. e., the threaded shank and immediately adjoining portion of the cylindrical head, is toughness, so that it may more readily withstand the imposed torsional and tensional strains which, particularly in the area where the shank joins the head, are frequently excessive. The essential physical characteristic of the operating portion of the screw, i. e., the socketed portion of the head, is hardness, so that the walls of the socket may stand up under and resist the reaming effect of the wrench which tends to render the socket inoperative to gear the wrench to the screw. Owing to the peculiar form of the screw, it has not, heretofore, been found commercially practicable to produce the screw with adequate degrees of toughness and hardness in the working and operating portions, respectively, and it has been customary to compromise between the two requirements, so that the screw is neither desirably hard in the operating portion nor desirably tough in the working portion. These inadequacies are demonstrated in a tendency of the working portion of the screw to rupture under extraordinary strain, particularly at the point where the head joins the shank; and under similar conditions the wrench may ream out the hexagonal walls of the socket. In either case the screw or a portion thereof is left in the work with no suitable means of removal.

It has been determined that a screw composed, for example, of chrome-nickel steel, may desirably exhibit hardnesses in the operating and working portions, respectively, of 48 to 50 and 36 to 38 Rockwell. Attempts to approximate these differing conditions by localized heat treatments have proven commercially impracticable. Superficial hardnesses of the desired degrees are sometimes obtainable, but such skin hardness is not adequate, it being essential that each of the operating and working portions exhibit throughout a substantial uniformity of hardness and toughness.

The object of the present invention is to provide a novel method of producing a screw of the stated type with any degrees of toughness and hardness in the working and operating portions of the screw that may be required, said method being adaptable to manufacture on an economical high production basis.

Another object of the invention is to provide a screw of the stated type wherein the working portion of the screw, inclusive of the threaded shank and the adjoining unsocketed portion of the cylindrical head, shall have the physical characteristics and composition best adapted to the requirements of that portion, and wherein further the operating portion embracing only the socketed part of the head shall exhibit different physical characteristics best suited to the requirements of that portion.

A further object of the invention is to provide a novel and improved method of integrally uniting the working and operating portions of the screw by an efficient and rapid welding operation productive of the results set forth above.

In the attached drawing:

Figure 1 is a view in perspective of a cap screw made in accordance with my invention;

Figs. 2 and 3 are, respectively, views in perspective of the working and operating portions of the screw prior to their union in the finished product;

Fig. 4 is a fragmentary sectional view on the line 4—4, Fig. 3, and

Figs. 5 and 6 are sectional views illustrating modifications within the scope of the invention.

With reference to the drawing, a screw of the character to which the invention relates comprises a threaded shank 1 and a cylindrical head 2 of greater diameter than the shank and provided in its outer terminal end with a suitable wrench-receiving socket 3. A screw of this character comprises in effect two distinct portions, one consisting of the shank 1 and the immediately adjoining portion 2a of the head which may be termed the working portion of the screw. It is this portion that does the work for which the screw is intended and that is subjected to the heavy strains of torsion and tension, the most critical area being that embracing the juncture of the head and shank. In order to withstand these strains, the working portion of the screw should be of tough and, therefore, relatively soft steel. The toughness required in the working portion of the screw is not essential in the socket part 2b of the head which constitutes the operating portion of the screw, and in fact the relatively soft characteristics of tough steel are highly undesirable in that the walls of the socket 3 should be hard in order to withstand the reaming tendency of the wrench. It is essential, therefore, to the operating portion of the screw that it have sufficient hardness to preclude the possibility of the wrench reaming the sides of the socket and thereby rendering the socket incapable of performing its normal function. In the conventional cap screw of this type, it has been found that if the screw be made sufficiently tough in the working part to meet the requirements, the operating part of the screw is then too soft to withstand the effects of the wrench. If on the other hand the screw is made throughout of a hardness adapted to the requirements of the operating portion, the working portion is then too brittle and is subject to fracture under the strains to which that portion of the screw may be subjected. I have discovered that it is possible by economical production method to manufacture this type of screw so that each of the working and operating portions of the screw shall have the exact degrees of toughness and hardness required for their different functions.

In accordance with my invention, I form the two parts, namely, the working and the operating portions of the screw as separate elements, such for example as shown in Figs. 2 and 3. The working portion of the screw may be formed in any suitable manner, as for example from steel bar stock of suitable composition and carbon content, on which the head portion 2a may be formed by an upsetting operation. The operating portion of the screw 2b may similarly be formed from cylindrical stock of any suitable composition and carbon content, and the socket 3 produced by punching or by drilling and subsequent broaching operations. It is desirable, however, in the practice of my invention and for reasons hereinafter set forth that the head 2a of the working portion be provided, as shown in Fig. 3, with a countersunk recess 4 in its outer end surface, this recess embracing the major portion of the surface area and leaving a narrow upstanding wall 5 as shown. It is desirable also that the end of the operating portion 2b of the head which in assembly abuts the said outer end surface of the head portion 2a be similarly recessed, and it is preferred that the wall 7 embracing the recess 6 have a width corresponding substantially to that of the wall 5 of the working portion. Preferably, also, the inner and outer sides of the wall 5 are beveled to provide an intermediate crest 5a, as shown more clearly in Fig. 4. By this means, the contact surface between the two portions of the screw when these portions are brought together is confined to the limited areas of the portions 5 and 7. When with this arrangement the two contact areas of the parts are brought individually to welding temperature and the two parts then forced together under pressure, a weld will be produced which efficiently unites the parts into what in effect is an integral structure.

For commercial practicability, it is necessary that the welding operation described above be accomplished with extreme rapidity so that manufacture of the screw may be conducted on a reasonable production basis. With the formation of the two separate portions of the screw described above wherein the contact areas between these portions are reduced to the dimensions of the narrow walls 5 and 7, it is possible, after these parts are brought together, to bring the metal within these areas to a welding temperature almost instantaneously by means of electric current, the circuit for which is established at the moment that the two portions come in contact with each other. This is aided materially by the crested form of the wall 5. The heating of the narrow walls 5 and 7 to the substantial exclusion of the adjoining portions of the metal is due to the relatively great resistance to the passage of current at the juncture of the two portions. I have found it practical by this method and with a relatively small thickness of the walls 5 and 7, say for example one-sixteenth of an inch in the case of a three-eighths inch screw, to establish a union between the two portions of the screw head affording greater strength at the juncture than in the remaining portions of the screw in spite of the fact that the weld embraces only a relatively small area in the circumferential portion of the head. This is due to the fact that by reason of the relatively great radial distance of the welded area from the axis of the screw as compared with the radius of the shank, particularly at the root of the thread, and the fact that tortional strains vary inversely as the fourth power of the diameter, the actual strain falling upon the welded juncture is only a relatively small part of the strain falling upon the relatively small shank. It is practical, therefore, in accordance with my invention to reduce the welded area to an extent permitting an almost instantaneous weld, while at the same time providing at the welded juncture a strength materially in excess of the strength inherent in the other portions of the screw.

Subsequent to the welding operation the screw is preferably annealed in order to reduce the excessive hardness in the welded area and to permit the finishing of the cylindrical surface of the head by a machine operation, any slight projection at the exterior of the welded juncture being removed. Any similar projection at the interior of the welded juncture is accommodated in the space formed between the countersunk recesses 4 and 6, and since the inner side of the walls 5 and 7 are removed radially from the sides of the hexagonal socket, any possibility of metal from the weld projecting into the bottom of the socket is avoided, so that the socket remains clean to the extreme bottom and is left available to the wrench throughout its entire length. The outer end of the head containing the socket is then trimmed to bring the head to the exact standardized longitudinal dimension, and the screw is then subjected to the usual heat treatment. In the finished product, the welded juncture is substantially invisible and the screw has the desirable appearance of the prior standard product.

While it is preferred to form the joined portions of the screw as shown in Figs. 2 and 3, there may be some modification, and in Figs. 5 and 6 I have illustrated two such modifications productive of satisfactory results. In each case, one only of the conjoined elements is formed of the narrow seating wall which, as described above, has been found to materially facilitate the welding operation. In each case, the said wall is tapered at the top to reduce the initial contact area of the two parts to a minimum, although it will be understood that this, while highly desirable, is not essential.

It is to be understood that there may be further modification without departure from the invention as defined in the appended claims, and, further, that the invention is applicable in principle to other forms of socketed screw than that illustrated, such, for example, as socketed stripper bolts.

It is to be noted that a screw made in accordance with this process will exhibit in the shank and in the adjoining cylindrical portion of the head constituting the entire working portion of the screw to the bottom of the screw in full degree the characteristics of toughness and strength required in that portion of the screw, whereas the remaining or socketed portion of the head will possess the hardness essential in that portion. It will be noted further that the physical characteristics of the two portions of the screw may be varied as required without reference to each other in order to meet any special requirements for a screw of this character.

I claim:

1. The method of producing socketed cap screws, which consists in separately forming the working and operating portions of the screw each of metal having a composition consistent with the function of said portion in the screw, said working portion including the shank of the screw and the adjoining transverse portion of the head and the operating portion embracing the socketed portion of the head, and uniting said portions by welding restricted to a narrow peripheral band adjoining the outer surface of the head.

2. The method of producing socketed cap screws, which consists in forming the head of the screw in two transverse sections, one of said sections containing the said socket and the other adjoining the screw shank, each of said sections being of a composition adapted to the function of said section in the screw, recessing the proximate ends of said sections to afford a narrow peripheral interseating surface, and welding said surfaces together.

3. The method of producing socketed cap screws, which consists in separately forming the working and operating portions of the screw, said working portion including the shank of the screw and the adjoining transverse section of the head and having a relatively tough and ductile composition and the operating portion consisting of the socketed section of the head and being of a relatively hard composition, recessing at least one of said head sections to limit the interseating surface of said sections to a narrow peripheral area adjoining the outer surface of the head, and uniting said sections together by welding confined substantially to the interseating area.

4. The method of producing socketed cap screws, which consists in forming the head of the screw in two transverse sections, one of said sections containing the said socket and the other of said sections adjoining the screw shank, each of said sections being of a composition suited to the function of said section in the screw, providing at least one of said sections at the end with a narrow projecting peripheral extension forming a seat of restricted surface area for the other of said sections, heating the interseating area of said sections to welding temperature by means of an electric current passed through the juncture, and forcibly pressing said sections together to produce a welded union confined substantially to the interseating area.

5. A socketed cap screw comprising a threaded shank and a head of greater transverse dimension than the shank and having a wrench-receiving socket in its upper end, the working portion of said screw embracing the shank and the adjoining unsocketed portion of the cylindrical head being formed integrally of relatively tough and ductile metal, and the operating portion of the screw embracing the socketed portion of the head being composed of a relatively hard metal and being secured to said working portion by welding.

6. A socketed cap screw comprising a threaded shank and a head provided at its outer end with a wrench-receiving socket, the working portion of said screw embracing the threaded shank and the adjoining portion of the cylindrical head being composed of a relatively tough and ductile metal capable of withstanding the strains to which this portion of the screw is subjected, the operating portion of the screw embracing the remaining and socketed section of the cylindrical head being composed of a relatively hard metal capable of withstanding the reaming effect of the wrench on the socket, said working and operating portions having interseating engagement with each other limited to a narrow annular area adjoining the outer cylindrical surface of the head and being united one with the other by welding within said interseating area.

7. A screw having in one end an axially extending wrench socket, the socketed portion being formed as a separate part of metal exhibiting a greater hardness than the other portions of the screw and being secured to the latter by welding.

8. The method of producing socketed screws, which consists in separately forming the socketed and unsocketed portions of the screw as separate parts each of a metal having characteristics best adapted to the function of said portion in the screw, at least one of said portions being recessed in the end thereof adjoined by the other portion to provide a narrow wall upon which the said other portion may seat, establishing an electric circuit through said portions to bring the metal in the seating area to welding temperature, and simultaneously pressing said portions together to produce a weld integrally uniting said portions.

9. The method of producing socketed screws, which consists in separately forming the socketed and unsocketed portions of the screw as separate parts each of a metal having characteristics best adapted to the function of said portion in the screw, at least one of said portions being provided at the end thereof adjoined by the other portion with a narrow outwardly tapered wall upon which the said other portion may seat, establishing an electric circuit through said portions to bring the metal in the seating area to welding temperature, and simultaneously pressing said portions together to produce a weld integrally uniting said portions.

HARALD F. GADE.